United States Patent [19]

Berkey

[11] Patent Number: 4,629,485
[45] Date of Patent: Dec. 16, 1986

[54] METHOD OF MAKING FLUORINE DOPED OPTICAL PREFORM AND FIBER AND RESULTANT ARTICLES

[75] Inventor: George E. Berkey, Pine City, N.Y.

[73] Assignee: Corning Glass Works, Corning, N.Y.

[21] Appl. No.: 535,786

[22] Filed: Sep. 26, 1983

[51] Int. Cl.$^4$ .......................................... C03B 37/014
[52] U.S. Cl. ........................................ 65/3.11; 65/2; 65/18.2; 65/DIG. 16
[58] Field of Search .................. 65/2, 3.11, 3.12, 18.2, 65/30.1, 30.13, 3.2, DIG. 16

[56] References Cited

U.S. PATENT DOCUMENTS

| | | | |
|---|---|---|---|
| 4,154,592 | 5/1979 | Bailey | 65/3.11 X |
| 4,161,505 | 7/1979 | Shirashi | 65/3.12 |
| 4,263,031 | 4/1981 | Schultz | 65/18.2 X |
| 4,385,128 | 5/1983 | Boudot | 501/42 |
| 4,414,008 | 11/1983 | Edahiro | 65/18.2 X |
| 4,441,788 | 4/1984 | Guerder | 350/96.34 |
| 4,533,378 | 8/1985 | Paek et al. | 65/3.12 |

FOREIGN PATENT DOCUMENTS

| | | | |
|---|---|---|---|
| 3230199 | 2/1984 | Fed. Rep. of Germany | 65/2 |
| 2428618 | 2/1980 | France | 65/3.12 |
| 54-134721 | 10/1979 | Japan | 65/18.2 |
| 55-67533 | 5/1980 | Japan | 65/3.12 |
| 55-167149 | 12/1980 | Japan | 65/DIG. 16 |
| 56-50136 | 5/1981 | Japan | 65/3.12 |
| 57-170831 | 10/1982 | Japan | 65/3.11 |
| 60-71536 | 4/1985 | Japan . | |
| 2029400 | 3/1980 | United Kingdom . | |
| 2096351 | 10/1982 | United Kingdom . | |

Primary Examiner—Kenneth M. Schor
Attorney, Agent, or Firm—W. J. Simmons, Jr.

[57] ABSTRACT

This invention relates to a method forming fluorine-doped glass. A coating of glass particles is deposited on the surface of a cylindrical rod of high purity glass. The coated rod is inserted into a furnace which contains a cylindrical muffle formed of high silica content glass. A fluorine-containing atmosphere is flowed through the muffle and over the outer surface of the coating of glass particles and also flows inwardly through the interstices thereof. The temperature within the furnace is sufficiently high to cause fluorine to diffuse into the surfaces of the glass particles and to cause the particles to fuse and form a fluorine-containing dense glass coating on the surface of the rod.

14 Claims, 8 Drawing Figures

METHOD OF MAKING FLUORINE DOPED OPTICAL PREFORM AND FIBER AND RESULTANT ARTICLES

BACKGROUND OF THE INVENTION

The present invention relates to an improved method of making an optical fiber perform having at least one region formed of a fluorine-doped glass.

Vapor deposition of doped silica is the most commonly employed technique for forming optical waveguide fibers. Such fibers are usually doped with $GeO_2$ or $P_2O_5$ to form a glass having a refractive index greater than that of silica or with $B_2O_3$ or fluorine to form a glass having a refractive index less than that of silica. Because of its low absorption at long wavelengths, fluorine is preferred over $B_2O_3$ for transmission at wavelengths beyond approximately 1.2 $\mu$m. Fluorine has been employed as the sole dopant in single-mode fibers having a silica core and a fluorine-doped silica clad. Fluorine has also been added along with other dopants in the core of a single-mode fiber to change the zero dispersion wavelength, and it has been added to other dopants to obtain the desired combination of properties such as refractive index and viscosity. For example, fluorine and $P_2O_5$ can be added to silica to form a diffusion barrier having the same refractive index as a silica substrate tube. However, the inclusion of fluorine as a dopant in vapor deposited glass has caused some disadvantages. U.S. Pat. No. 4,335,934 reports that fluorine tends to reduce the rate of deposition of doped silica glass on the inner surface of a substrate tube. It has been found that the addition of a fluorine-containing compound to the reactant stream emitted by a flame hydrolysis burner tends to decrease the rate of deposition of glass soot collected on the mandrel. Also, seeds were commonly formed in the resultant article when both fluorine and germania were co-deposited with silica.

A further disadvantage was experienced while attempting to form fluorine-doped silica by supplying $C_2F_6$ to a flame hydrolysis burner. Even though the amount of $C_2F_6$ was increased, the amount of fluorine in the resultant glass could not be increased to more than 0.6 wt. %. It is thought that a fluorine-doped silica particle is not immediately formed; rather, the fluorine must diffuse into the silica particle as it travels from the burner to the soot preform. Such diffusion must take place within a fraction of a second. The partial pressure of fluorine adjacent to the silica particle is very low since the fluorine supplied to the flame diffuses into the ambient atmosphere. Furthermore, some of fluorine adjacent the silica particle reacts with hydroxyl ions present in the flame to form HF; this fluorine is no longer available to dope the particle.

SUMMARY OF THE INVENTION

It is therefore an object of the present invention to provide an improved method of forming a fluorine-containing optical waveguide preform. Another object is to reduce or eliminate the formation of seeds in fluorine-containing optical waveguide preforms. Yet another object is to provide a method of forming CVD-produced fluorine-containing optical fiber preforms without depressing the deposition rate.

The present invention relates to a method of forming a glass article, at least a portion of which is doped with fluorine. There is initially formed a glass preform, at least a portion of which is porous. The preform is inserted into a consolidation furnace. An atmosphere comprising fluorine is flowed over the surface of the porous portion of the preform. A portion of the atmosphere diffuses inwardly from the surface through the interstices of the porous portion of the preform. In the furnace the preform is heated to a temperature within the consolidation temperature for a time sufficient to cause the fluorine to diffuse into the pore-forming surfaces and to cause the porous portion of the preform to fuse and form a dense glass.

DESCRIPTION OF THE PREFERRED EMBODIMENT

It is to be noted that the drawings are illustrative and symbolic of the invention, and there is no intention to indicate scale or relative proportions of the elements shown therein. Further, it is to be noted that the present invention expressly contemplates both single mode and multimode waveguides regardless of any specific description, drawing, or example set out herein.

In accordance with the present invention any portion of an optical fiber preform can be doped with fluorine by forming that portion as a porous coating or structure which is thereafter subjected to a fluorine-containing atmosphere at an elevated temperature prior to the completion of the consolidation process which converts the porous coating or structure to a solid glass coating or structure. An example of such a method is illustrated in FIGS. 1 through 5.

Figure 1:
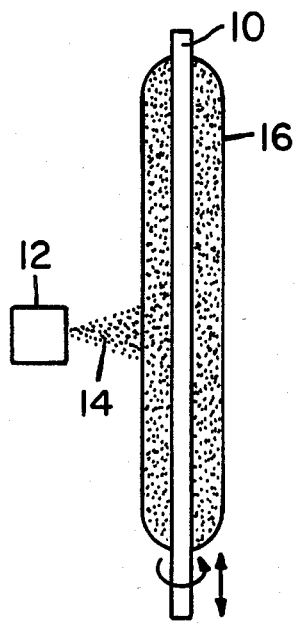
FIG. 1 illustrates the application of a coating of glass soot to a mandrel.

A circularly symmetric porous preform may be formed in accordance with the method illustrated in FIG. 1. The ends of mandrel 10 are mounted in a lathe where it is rotated and translated as indicated by the arrows. The mandrel may be provided with a layer of carbon soot to facilitate removal of the soot preform.

Fuel gas and oxygen or air are supplied to burner 12 from a source (not shown). This mixture is burned to produce a flame which is emitted from the burner. A gas-vapor mixture is oxidized within the flame to form a soot stream 14 which is directed toward mandrel 10. Suitable means for delivering the gas-vapor mixture to the burner are well known in the art; for an illustration of such means reference is made to U.S. Pat. Nos. 3,826,560, 4,148,621 and 4,173,305. One or more auxiliary burners (not shown) may be employed to direct a flame toward one or both ends of the soot preform during deposition to prevent breakage. For an illustration of suitable burners, reference is made to U.S. Pat. Nos. 3,565,345 and 4,165,223. Soot deposition means 12 may also comprise nozzles such as those disclosed in U.S. Pat. No. 3,957,474 which emit reactant vapors which are heated by means such as a laser beam to form a soot stream. This method can be employed to produce any type of core index profile including step index and gradient index. In the present example, only the reactant $SiCl_4$ need be supplied to burner 12, since a pure silica soot preform 16 is deposited.

The burner is generally operated under conditions that will provide acceptably high laydown rates and efficiency while minimizig the buildup of soot on the face thereof. Under such conditions, the flow rates of gases and reactants from the burner orifices and the sizes and locations of such orifices as well as the axial orientation thereof are such that a well focused stream of soot flows from the burner toward the mandrel. In addition, a cylindrical shield (not shown) which is spaced a short distance from the burner face, protects the soot stream from ambient air currents and improves laminar flow. Preform 16 is formed by traversing mandrel 10 many times with respect to burner 12 to cause a build-up of many layers of silica soot. The translating motion could also be achieved by moving the burner back and forth along the rotating mandrel or by the combined translational motion of both the burner and the mandrel. After the deposition of soot preform 16, mandrel 10 is pulled therefrom, thereby leaving a longitudinal aperture through which drying gas may be flowed during consolidation.

The steps of drying and consolidating may be preformed in accordance with the teachings of U.S. Pat. No. 4,165,223, which patent is hereby expressly incorporated by reference.

Figure 2:
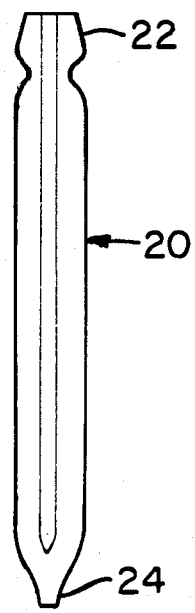
FIG. 2 is a cross-sectional view of a consolidated glass preform.

A consolidated preform 20 is illustrated in FIG. 2. During consolidation, the preform may be suspended by a handle 22 which may be attached to the preform during the deposition operation or after the mandrel has been removed. Such handles have a passage therethrough for supplying drying gas to the preform aperture.

Drying can be facilitated by inserting a short section of capillary tubing into that end of the porous preform aperture opposite handle 22. The capillary tubing initially permits some of the drying gas to flush water from the central region of the preform. As the porous preform is inserted into the consolidation furnace, the capillary tubing apertures closes, thereby causing all drying gas to thereafter flow through the preform interstices.

After consolidation, the preform aperture will be closed at end 24 as shown in FIG. 2 due to the presence of the aforementioned capillary plug. If no plug is employed the entire aperture will remain open. In this event end 24 is closed after consolidation by a technique such as heating and pinching the same.

For certain soot compositions including pure silica, conventional soot deposition techniques result in the formation of a devitrified layer on the aperture-forming surface of the resultant glass preform during the consolidation process. If such a devitrified layer exists in the preform, it should be removed by etching to prevent the formation of seeds in the resultant fiber. If end 24 of the preform aperture closes during consolidation, that end must be severed to permit an acid was to flow freely through the aperture in order to effectively remove the devitrified layer. Thereafter, the aperture is rinsed and dried, and end 24 is heated and sealed.

A preferred method of forming a silica soot preform, which is disclosed in my U.S. Pat. No. 4,453,961, prevents devitrification of the aperture-forming surface during consolidation. That method comprises depositing the first plurality of layers of glass soot on the mandrel at a deposition rate that is sufficiently low that no spiral pattern of deposited soot is visible. The deposition of a fine, spiral-free coating on mandrel 10 can be accomplished by supplying burner 12 with a greatly reduced flow of reactant. The absence of a high velocity reactant vapor stream emanating from the burner tends to generate a defocused soot stream 14 that is incapable of depositing a coating of soot having a sufficient density variation to appear as a spiral. After many layers are deposited, the fine soot stream becomes continuous.

After the unfocused soot stream has been employed for a time sufficient to build up a continuous layer, the flow of reactants to the burner is increased to conventional rate, and the remainder of preform 16 is deposited at a normal high deposition rate.

Consolidated preform 20 of FIG. 2, which forms the core of the resultant fiber, is etched to remove a thin surface layer. It is then stretched into an intermediate, large diameter fiber which is thereafter provided with fluorine-doped cladding in accordance with the method of the present invention.

Figure 3:
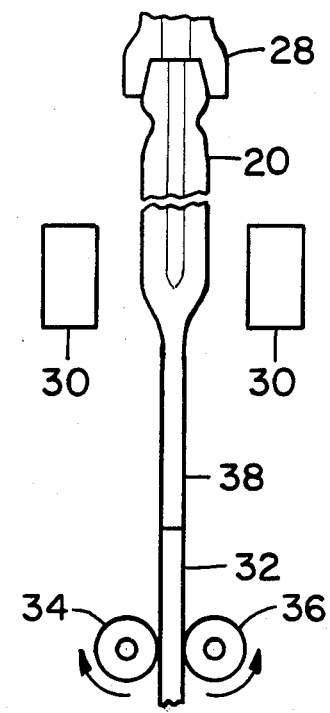
FIG. 3 is a schematic diagram illustrating the drawing of a rod from the preform.

The intermediate fiber can be formed in a conventional draw furnace wherein the tip of the consolidated preform from which the intermediate fiber is being drawn is heated to a temperature which is slightly lower than the temperature to which the preform would be subjected to draw optical fiber therefrom. A temperature of about 1900° C. is suitable for a silica preform. A suitable method for forming an intermediate fiber is illustrated in FIG. 3. Perform 20 is mounted in a conventional draw furnace where the tip thereof is heated by resistance heater 30. A vacuum connection 28 is attached to handle 22, and the preform aperture is evacuated. A glass rod 32, which is attached to the bottom of preform 20, is pulled by a motor-driven tractors 34, 36, thereby causing the intermediate fiber 38 to be drawn at a suitable rate. A rate of 15 to 23 cm/min has been found to be adequate. As the intermediate fiber is drawn, the aperture readily closes since the pressure therein is low relative to ambient pressure. The diameter of an intermediate fiber that is to be employed as a mandrel upon which cladding soot is to be deposited is preferably in the range of 4 to 10 mm.

Figure 4:
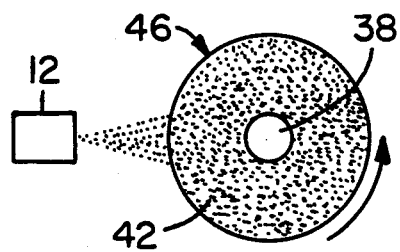
FIG. 4 illustrates the application of a coating of glass cladding soot to an intermediate fiber.

Intermediate fiber 38 is mounted in a lathe where it is rotated and translated with respect to burner 12 as shown in FIG. 4. A coating 42 of silica soot is thereby built up on the surface thereof to form a composite preform 46.

In accordance with the method of the present invention, fluorine is added to porous silica coating 42 during consolidation of that coating. Consolidation furnaces conventionally comprise an alumina muffle surrounded by heating elements, the consolidation gases flowing through holes in a base member on which the muffle rests. Attempts were made to introduce fluorine into the porous silica coating 42 by flowing $C_2F_6$ into the muffle along with conventional consolidation gases He, $O_2$ and $Cl_2$. The fluorine, which formed at consolidation temperture, reacted with the alumina muffle and transported aluminum and possibly other impurities to the composite preform 46. The resultant consolidated preform contained a thick devitrified surface layer which rendered it useless. Other refractory materials such as zirconia would probably suffer from the same disadvantage.

Figure 5:
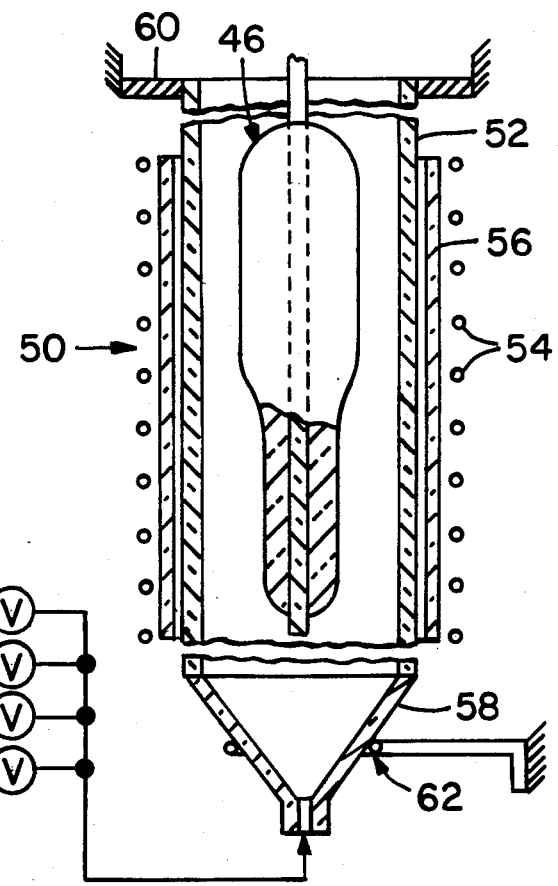
FIG. 5 is a schematic representation of a consolidation furnace and consolidation atmosphere system.

The consolidation furnace was therefore modified in the manner illustrated in FIG. 5. A high silica content muffle 52 is separated from heating elements 54 by a tubular, high silica content liner 56. The term "high silica content" as used herein means pure fused silica or a high silica content glass such as a borosilicate glass. Porous silica coating 42 would conventionally be consolidated at 1470° C. The diffusion of 1 wt. % fluorine into the silica during the consolidation process enables the consolidation to be performed at 1400° C. Higher concentrations of fluorine in the porous glass would enable it to be consolidated at even lower temperatures. A high silica content glass muffle 52 can be employed because of this relatively low consolidation temperature. Liner 56 surrounded muffle 52 in the vicinity of heating elements 54 to protect muffle 52 from refractory particles emanating from the furnace bricks (not shown) which surround the heating elements. These refractory particles deposited on the outer surface of liner 56 and caused some devitrification to occur. Although liner 56 is not a necessity, it is thought that its use may prolong the lifetime of muffle 52.

Furnace gases are fed to the bottom of muffle 52 through a conical section 58 which is affixed thereto. Whereas the conventional alumina muffle was supported only by its bottom surface, silica muffle 52 was supported at its upper end by a ring 60 to provide additional support for the middle section thereof which tends to sag at consolidation temperature. Conical section 58 is supported by ringstand 62.

As taught in U.S. Pat. No. 4,165,223, the consolidation atmosphere may contain helium and oxygen and an amount of chlorine sufficient to remove hydroxyl ions from the porous preform. In accordance with the method of the present invention, fluorine is also supplied to the bottom of muffle 52. Any suitable compound such as $C_2F_6$, $C_2F_2Cl_2$, $CF_4$ and $SF_6$ may be employed. By taking suitable precautions which are known in the art, fluorine gas ($F_2$) can be used.

The following specific example illustrates the manner in which the method of the present invention can be employed to produce a single-mode optical waveguide fiber having a pure silica core and a fluorine-doped silica cladding. An integral handle of the type disclosed in U.S. Pat. No. 4,289,522 was employed. An alumina mandrel was inserted into the handle, the central region where soot particles were ultimately deposited being tapered in diameter from about 5.5 mm to 6.5 mm.

Liquid $SiCl_4$ was maintained at 37° C. in a container. The burner traversed a 49 cm section of mandrel in 25 seconds. An acetylene torch supported on the burner was first employed to deposit carbon particles on the mandrel during one burner pass. During the next 30 minutes, oxygen flowed at a rate of 0.05 slpm through the $SiCl_4$ container, the resultant mixture flowing to the burner. The resultant fine soot stream formed a layer of silica soot having a thickness of about 1 mm. During the next 6½ hours, the flow rate of oxygen to the $SiCl_4$ container was increased to 1.4 slpm during which time silica soot was deposited to form a soot preform, the outer diameter of which was 70 mm.

The soot preform was removed from the lathe, and the mandrel was removed therefrom, the integral handle remaining at one end thereof. A short section of capillary tubing was inserted into that end of the preform aperture opposite the handle. The preform was then simultaneously dried and consolidated in accordance with the teachings of U.S. Pat. No. 4,125,388. A drying gas consisting of 5 volume percent chlorine, the balance being helium, was flowed through the handle and into the preform aperture. A portion of this drying gas initially flowed through the capillary plug carrying with it water vapor along with reaction products from the drying reaction. As the preform was lowered into the consolidation furnace, through which a helium flushing gas was flowing, the opening in the capillary tube became sealed, and the preform was subjected to gradient consolidation. The consolidated silica preform was etched in HF to remove a thin surface layer.

A silica rod was fused to the tip of the consolidated preform which was then inserted into a draw furnace. The preform aperture was evacuated by affixing vacuum connection 28 to the end of the handle. The preform was heated to about 1900° C. and pulled downwardly at a rate of about 15 cm/mm. The diameter of the resultant intermediate fiber was about 5 mm. After the intermediate fiber has been drawn to a length of about 91 cm, it was broken from the preform.

The intermediate fiber was supported in the lathe where it functioned as a mandrel for the deposition of cladding soot. Oxygen flowed through the $SiCl_4$ container at a rate of 1.6 slpm, and the burner traversed the intermediate fiber at a rate of about 2 cm/sec. This was continued until a layer of $SiO_2$ having an outside diameter of 60 mm was deposited to form a soot clad preform.

Furnace muffle 52 consisted of a 152 cm long silica cylinder having an inner diameter of 14.6 cm and an outer diameter of 15.2 cm. A 61 cm long silica liner 56 having an inner diameter of 18.1 cm and an outer diameter of 18.7 cm separated muffle 52 from the heating elements. The peak temperature, as measured at the outside of the silica liner was 1430° C. Chlorine, oxygen, helium and $C_2F_6$ flowed into the bottom of the muffle at rates of 1.4 slpm, 2.0 slpm, 25.0 slpm and 12 slpm, respectively.

The soot clad preform was inserted into the furnace at a downfeed rate of 0.4 cm/min. The $C_2F_6$ decomposed to form fluorine which diffused uniformly through the interstices of the porous silica coating and into the silica soot which thereafter consolidated to form a fluorine-doped silica cladding layer on the silica core. The core-clad ratio of the consolidated preform was too large for forming a single-mode fiber. The preform was therefore etched in HF for 60 minutes, rinsed and dried. It was then stretched in a draw furnace in the manner indicated above to again form an intermediate fiber having a diameter of about 5 mm and a length of about 91 cm. This intermediate fiber was provided with a coating of silica soot and consolidated and doped with fluorine under the same consolidation conditions as described above. The resultant optical fiber preform, the diameter of which was about 35 mm, was inserted into a draw furnace where the tip thereof was subjected to a temperature of about 2100° C. The preform was drawn to form a step-index, single-mode optical waveguide fiber having a core diameter of about 8 μm.

Figure 6:
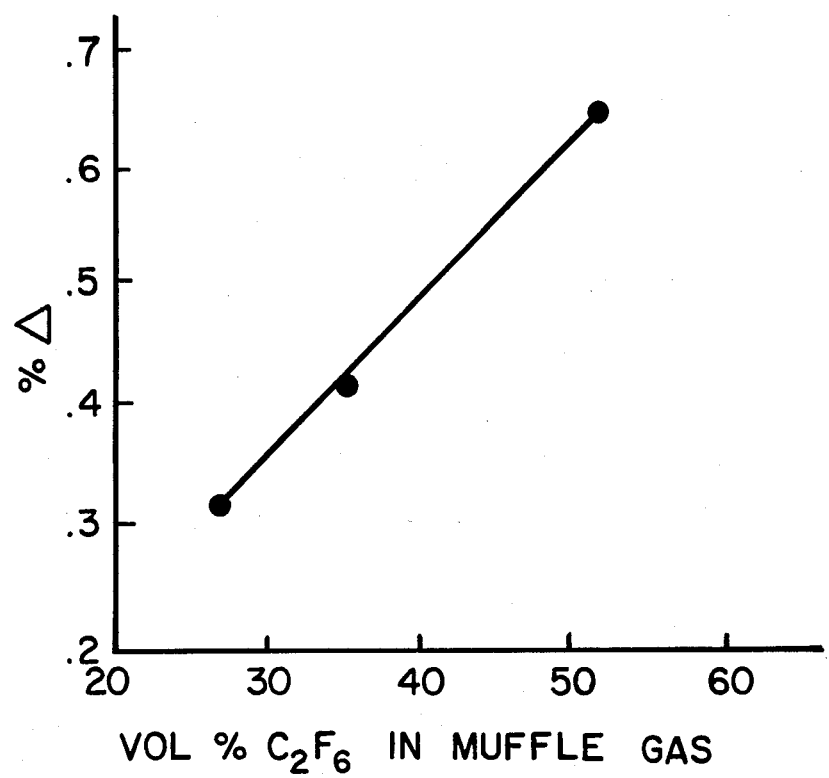
FIG. 6 is a graph of %$\Delta$ plotted as a function of vol. % $C_2F_6$ in the muffle gas.

A measure of the amount of fluorine in the cladding of a silica core-fluorine doped silica clad fiber is given by its Δ% which is defined as $(n_1-n_2)/n_1$ where $n_1$ and $n_2$ are the core and clad refractive indices, respectively. When the amount of $C_2F_6$ in the muffle gas was 27 vol. %, a 0.35 %Δ was achieved. As the $C_2F_6$ was increased to 35 vol. % and 54.5 vol. %, the %Δ increased to 0.42 and 0.64, respectively. The linear relationship between vol. % $C_2F_6$ and %Δ within the specified range is illustrated in FIG. 6. A %Δ of only 0.24 was obtained when the muffle gas contained about 25 vol. % $C_2F_2Cl_2$.

Figure 7:
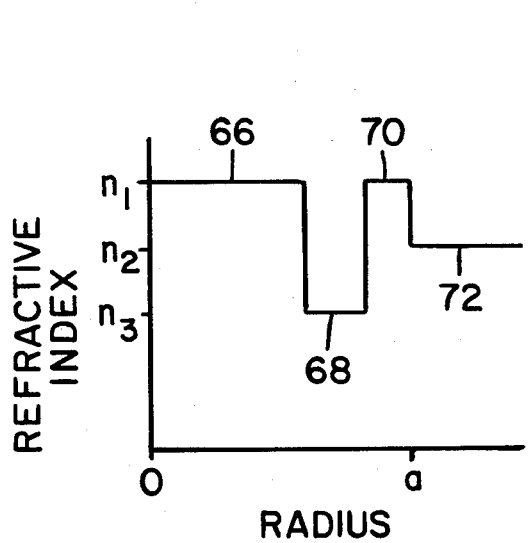
FIG. 7 is a refractive index profile of an optical fiber formed by the method of the present invention.

A single-mode fiber having a germania-doped silica core was formed as follows. FIG. 7 shows the refractive index profile of the resultant fiber which includes inner core region 66, index depression 68, outer core region 70 and cladding 72.

The burner was supplied with $SiCl_4$ as described above. A sufficient amount of $GeCl_4$ was simultaneously supplied to the burner to form soot having a composition of 10 wt. % $GeO_2$ 90 wt. % $SiO_2$. The resultant soot preform, which was consolidated and stretched as illustrated in FIGS. 2 and 3, had a refractive index $n_1$ as shown in FIG. 7. A layer of $SiO_2$ soot was then deposited on the $GeO_2$-doped $SiO_2$ rod as illustrated in FIG. 4. The resultant composite structure was consolidated in the apparatus of FIG. 5. The muffle gas was as described in the previous example except that the flow rate of $C_2F_6$ was such that the muffle gas contained about 33 vol. % $C_2F_6$. The consolidated layer, referred to as the depressed index region, had a composition of about 1.2 wt. % fluorine and 98.8 wt. % $SiO_2$. Its refractive index is shown as being $n_3$ in FIG. 7.

Another layer of soot was deposited over the resultant consolidated preform. The composition was again silica doped with 10 wt. % $Geo_2$ whereby the refractive index is represented by line 70 of FIG. 7. This soot was consolidated in the furnace of FIG. 5, but no fluorine-containing gas was employed. The resultant core preform was overcoated with silica soot which was also consolidated in a chlorine-containing atmosphere that contained no fluorine. This pure silica cladding layer is represented by line 72 of FIG. 7. Its refractive index $n_2$ is about equal to $(n_1 + n_3)/2$. The resultant optical fiber preform was drawn into a single-mode fiber having an overall core diameter $2a$ of 16 μm. The attenuation of this fiber at 1300 nm was 0.65 dB/km and at 1600 nm was 0.18 dB/km. Its water content was determined to be about 550 ppb.

For certain reasons including modification of the softening point temperature of the core glass or modification of the zero dispersion wavelength of a single-mode fiber, it may be desirable to add fluorine to a core glass which also contains a dopant such as germania for increasing the refractive index thereof. A soot preform was formed on a mandrel as described above, $GeCl_4$ being fed to the burner along with $SiCl_4$ during the formation of a core portion. The $GeCl_4$ flow was stopped, and a sufficient amount of silica soot was deposited to provide a core-clad ratio of 0.4. The formation of such a preform is disclosed in my aforementioned application Ser. No. 402,056. The mandrel was removed and a short section of capillary tubing was inserted into one end of the preform aperture. The preform end containing the capillary tubing was inserted into a consolidation furnace and an atmosphere comprising 3.7 vol. % $Cl_2$ 3.7 vol. % $CCl_2F_2$ and the balance He was flowed into the aperture so that it flowed outwardly through the intersticies. The presence of fluorine in the gas flowing into the aperture leached almost all of the germania from the entire preform core portion, wherefore the resultant consolidated preform was unsuitable for further processing.

An identical soot preform having a germania-doped core portion was consolidated in the furnace of FIG. 5. The capillary tubing in lower end of the preform aperture prevented the flow of fluorine directly into the aperture and also caused the bottom end of the aperture to close during consolidation. This preform suffered very little loss of germania during the consolidation process, and there was not even any evidence of burnout or severe loss of germania at the aperture forming surface. Since there is no contemplated embodiment of the present invention in which it would be advantageous to flow the fluorine-containing gas into the aperture of a porous preform, this invention is limited to that embodiment wherein the fluorine-containing atmosphere is flowed over the outer surface of the porous portion of the preform and diffuses inwardly. This technique is to be employed regardless of the shape of the porous preform. That is, a porous cylinder having an aperture therethrough, a solid rod completely surrounded by a soot coating or a planar substrate having a soot coating on one or more surfaces thereof, for example, would all be treated by flowing the fluorine-containing gas over the outer surface of the porous layer.

Figure 8:
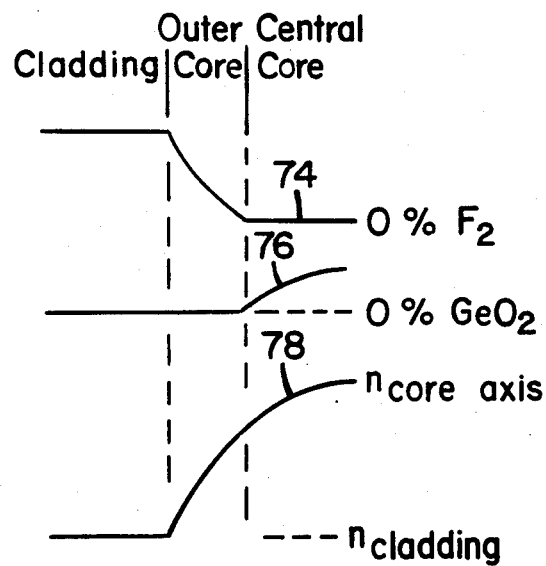
FIG. 8 is a diagram showing the compositional structure and the refractive index of an optical fiber made in accordance with an embodiment of the invention.

An optical fiber having a graded index core can be formed as follows. The central core portion of the preform is formed by any suitable technique which results in a solid rod having a silica surface and an axial composition comprising silica and a dopant such as $GeO_2$ which increases the refractive index. For example, the method illustrated in FIGS. 1, 2 and 3 could be employed. By supplying the burner with $SiCl_4$ and $GeCl_4$, a layer of $GeO_2$-doped $SiO_2$ is deposited on the mandrel during a first pass of burner 12. After each pass of the burner, the flow rate of $GeCl_4$ is reduced so that the final burner pass deposits pure $SiO_2$. The resultant soot preform is consolidated to form the article illustrated in FIG. 2. The consolidated preform is heated as illustrated in FIG. 3 to close the central aperture and to stretch it into a rod having a diameter suitable for the further deposition of soot. The resultant rod has a germania content illustrated by that portion of curve 76 of FIG. 8 which is situated within the central core region. A suitable length of the germania-doped central core rod is inserted in a lathe and coated with pure silica soot as illustrated in FIG. 4. The resultant composite preform is inserted into a consolidation furnace through which there initially flows flushing gases which contain no fluorine. The preform is initially heated to a temperature that is insufficient to cause consolidation. A fluorine-containing gas is then added to the flushing gas and the temperature of the furnace is increased to a level sufficiently high to cause consolidation to occur uniformly throughout the preform. By controlling the concentration of fluorine flowing through the consolidation furnace, the maximum consolidation temperature and the rate of increase of temperature to the maximum temperature, the consolidated soot coating can be caused to contain a fluorine gradient which increases from 0% fluorine at the interface to a maximum concentration at the outer surface of the outer core. This fluorine gradient is represented by the gradient portion of curve 74 of FIG. 8.

The resultant consolidated preform is again stretched and severed into suitable lengths which are overclad with pure silica soot. This final soot clad preform can be subjected to the gradient consolidation process described in conjunction with FIG. 5. By decreasing the concentration of fluorine flowing through the consolidation muffle but subjecting the porous silica soot coating to fluorine-containing gas for a sufficient period of time, the consolidated cladding portion of the preform can be provided with a fluorine concentration which is equal to that of the highest fluorine concentration of the outer core portion of the preform. An optical fiber drawn from the resultant preform would have a refractive index profile of the type illustrated by curve 78 of FIG. 8.

It is well known that porous soot preforms produced by the flame hydrolysis process contain hydroxyl ions which must be removed prior to the time that the soot consolidates in order to avoid excessive losses in the resultant optical fiber. The preferred technique for removing hydroxyl ions has been to consolidate the porous preform in a chlorine-containing atmosphere. In the specific example described above chlorine is employed to assist in the drying of the soot preform even though some of the fluorine employed for doping the preform would react with the hydroxyl ions to form HF which would be swept away with the flushing gas since it is volatile at consolidation temperature. If no chlorine is added to the consolidation atmosphere, the fluorine present therein will simultaneously dry and dope the soot preform during consolidation.

I claim:

1. A method of forming a glass article at least a portion of which is doped with fluorine, comprising the steps of
    forming a glass preform at least a portion of which is porous and contains interstices,
    inserting said preform into a consolidation furnace having a muffle formed of a high silica content glass,
    flowing over the surface of said porous portion a gas comprising fluorine, a portion of said gas diffusing inwardly through the interstices of said preform, and
    heating said porous preform to a temperature within the consolidation temperature range for a time sufficient to cause said fluorine to diffuse into the surfaces of said interstices and to cause the porous portion of said preform to fuse and form a fluorine-doped dense glass.

2. A method in accordance with claim 1 wherein the step of inserting comprises inserting said preform into a consolidation furnace formed of a silica muffle, a heat source surrounding said muffle, and a high silica content liner situated between said muffle and said heat source.

3. A method in accordance with claim 1 wherein the step of heating comprises gradually inserting said porous preform into said muffle so that the leading end thereof initially consolidates, the remaining portion of said porous preform consolidating in a gradient fashion as it is gradually inserted into said muffle.

4. A method in accordance with claim 1 wherein the step of heating said porous preform comprises subjecting the entire porous portion of said preform to a temperature within the consolidation temperature range whereby consolidation occurs simultaneously along the entire range of said preform.

5. A method in accordance with claim 1 wherein the step of heating comprises heating said porous preform to a temperature which is lower than that which would conventionally be used to consolidate the porous portion of said preform in the absence of fluorine.

6. A method in accordance with claim 1 wherein the step of forming comprises forming a glass preform, the porous portion of which is deposited by the flame hydrolysis process.

7. A method in accordance with claim 1 wherein the step of forming comprises forming an entirely porous glass preform comprising a core region of a first composition surrounded by a cladding region having a refractive index lower than that of said core region, said fluorine diffusing into and lowering the refractive indices of both said core and cladding regions.

8. A method in accordance with claim 7 wherein the step of forming comprises forming an entirely porous glass preform comprising a core region of $SiO_2$ and a dopand which increases the refractive index of said core region, said core region being surrounded by a cladding region of $SiO_2$.

9. A method in accordance with claim 1 wherein the step of forming comprises forming an entirely porous glass preform comprising first and second regions which are located radially adjacent one another, said regions having different compositions and different refractive indices, said fluorine diffusing into and lowering the refractive indices of both said first and second regions.

10. A method in accordance with claim 9 wherein the step of forming comprises forming an entirely porous glass preform comprising first and second regions which are located radially adjacent one another, said first region being formed of $SiO_2$ and said second region comprising $SiO_2$ and a dopant which increases the refractive index of said second region.

11. A method in accordance with claim 1 further comprising the step of drawing said dense glass article to form an optical fiber.

12. A method in accordance with claim 1 wherein, prior to the step of flowing, a fluorine-free gas is flowed over the surface of said porous portion and said preform is heated to a temperature that is insufficient to cause consolidation to occur, the step of flowing thereafter being initiated and said entire preform being subjected to a temperature sufficiently high to cause consolidation thereof to a dense glass.

13. A method in accordance with claim 1 wherein the step of flowing is carried out such that said fluorine diffuses uniformly through the interstices of said preform prior to the formation of a dense glass whereby the concentration of fluorine is constant throughout said fluorine-doped dense glass.

14. A method in accordance with claim 1 wherein the step of flowing comprises flowing a gas including a sufficient amount of chlorine to dry said preform.

* * * * *